(12) United States Patent
Kuo

(10) Patent No.: US 6,173,818 B1
(45) Date of Patent: Jan. 16, 2001

(54) DEVICE FOR ADJUSTING A BRAKE PAD

(76) Inventor: Yung-Pin Kuo, No.55, Alley 121, Lane 175, Kuo Shen Rd., Chang Hwa City (TW)

( * ) Notice: Under 35 U.S.C. 154(b), the term of this patent shall be extended for 0 days.

(21) Appl. No.: 09/339,185

(22) Filed: Jun. 24, 1999

(51) Int. Cl.$^7$ .................................................. B62L 1/06
(52) U.S. Cl. ............................................................ 188/24.19
(58) Field of Search ............................ 188/24.19, 24.12, 188/24.11, 24.14, 24.21, 24.22

(56) References Cited

U.S. PATENT DOCUMENTS

| | | | | |
|---|---|---|---|---|
| 5,788,020 | * | 8/1998 | Tseng ................................. | 188/24.12 |
| 5,853,069 | * | 12/1998 | Lee et al. ......................... | 188/24.19 |
| 5,960,913 | * | 10/1999 | Kuo ................................... | 188/24.19 |
| 6,105,733 | * | 8/2000 | Tsai ................................... | 188/24.12 |
| 6,109,397 | * | 8/2000 | Chen ................................. | 188/24.22 |

* cited by examiner

Primary Examiner—Robert J. Oberleitner
Assistant Examiner—Melanie Talavera
(74) Attorney, Agent, or Firm—Rosenberg, Klein & Lee

(57) ABSTRACT

A brake caliper adjusting device includes a cam member fixedly received in the frame of the caliper and fixedly mounted to a shaft to which the frame of the caliper is mounted. A pushing member is pivotally received in the frame with the lower end engaged with the cam member. A supporting member is biasedly connected to the brake caliper and a brake pad is fixedly connected to the supporting member. One of two sides of the supporting member contacts the upper end of the pushing member. An adjusting member is rotatably mounted to the shaft. A biasing member has one end thereof received in the groove and the other end of the biasing member is connected to the caliper. A bolt extends through the adjusting member and is engaged with a threaded hole in the shaft so that the adjusting member can be rotated by rotating the bolt. The brake pad is adjusted when the adjusting member is rotated relative to the brake caliper.

6 Claims, 7 Drawing Sheets

DEVICE FOR ADJUSTING A BRAKE PAD

The present invention relate to an adjusting device for adjusting a brake caliper toward the wheel rim of a bicycle so as to change the angle of the brake pad relative to the wheel rim.

BACKGROUND OF THE INVENTION

A conventional brake pad adjusting device known to applicant is disclosed in U.S. Pat. No. 5,960,913 having a title of "DEVICE FOR ADJUSTING THE BRAKE PAD RELATIVE TO THE WHEEL RIME OF A BICYCLE". The U.S. Pat. No. 5,960,913 is invented by the applicant and is allowable, the Letter Patent of the application will be granted after the issue fee being paid. In the allowable application, the angle of the contact surface of a brake pad can be adjusted relative to the wheel rim by operating the actuating means, the cam member and the pushing member. The adjustment of the brake pad can only be made by moving the actuating means which is a bolt extending through the bottom of the frame portion of the brake caliper. Nevertheless, the thickness of the bottom of the frame portion is so thin so that the structural strength of the bottom will be weakened when a threaded hole is drilled through the bottom. Furthermore, the total weight of the brake caliper will be increased because the bolt extends through the bottom.

The present invention provides a device for adjusting the brake caliper to adjust the angle of the brake pad relative to the wheel rim without adding the total weight of the brake caliper.

SUMMARY OF THE INVENTION

A brake caliper adjusting device comprises a brake caliper comprising a frame and a head extending from the top of the frame portion. The frame has two sidewalls with a bottom connected therebetween and each of the sidewalls has an aperture defined therethrough for a shaft extending through the two apertures. The shaft has a threaded hole defined radially in one of two ends thereof. A supporting member has a brake pad connected thereto. A lug extends from a side of the supporting member and is pivotally received between the two sidewalls of the frame.

A cam member is fixedly mounted to the shaft and located between the two sidewalls of the frame. A pushing member is pivotally received between the two sidewalls of the frame. Two ends of the pushing member contacts the cam member and the supporting member.

An adjusting member is connected to the outside of the frame and rotatably mounted to the shaft. The adjusting member has a groove defined in one of two sides thereof. A lug extends from the other side of the adjusting member and has a slot defined therethrough. A biasing member has the first end thereof connected to the head of the brake caliper and the second end of the biasing member is received in the groove of the adjusting member. A bolt extends through the slot and is engaged with a threaded hole in the shaft.

The main object of the present invention is to provide a brake caliper adjusting device which has an adjusting member on a side of the frame of the brake caliper and the brake caliper can be rotated relative to the shaft by operating a bolt passing through the adjusting member and engaged with the shaft.

Further features of the present invention will become apparent after a careful reading of the detailed description with appropriate reference to the accompanying drawings.

DETAILED DESCRIPTION OF THE PREFERRED EMBODIMENT

Figure 1:
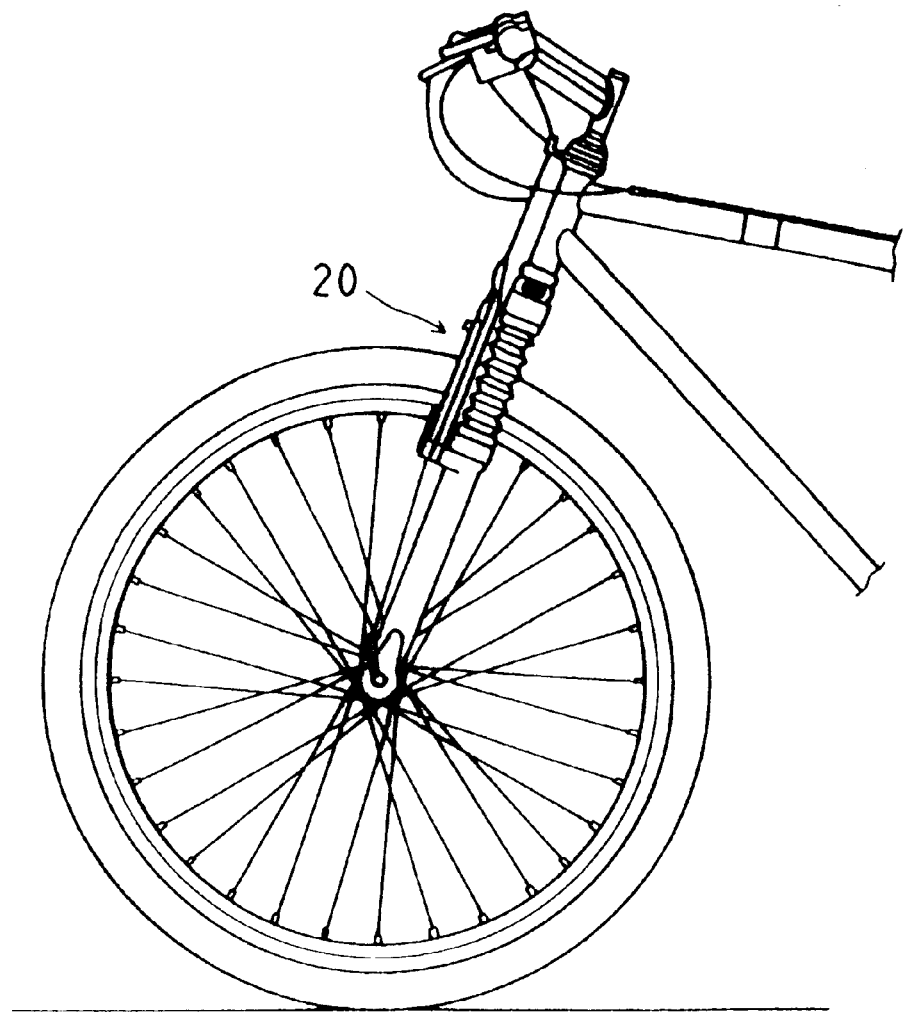
FIG. 1 is an illustrative view to show a bicycle and a brake caliper system connected to the bicycle.
Figure 2:
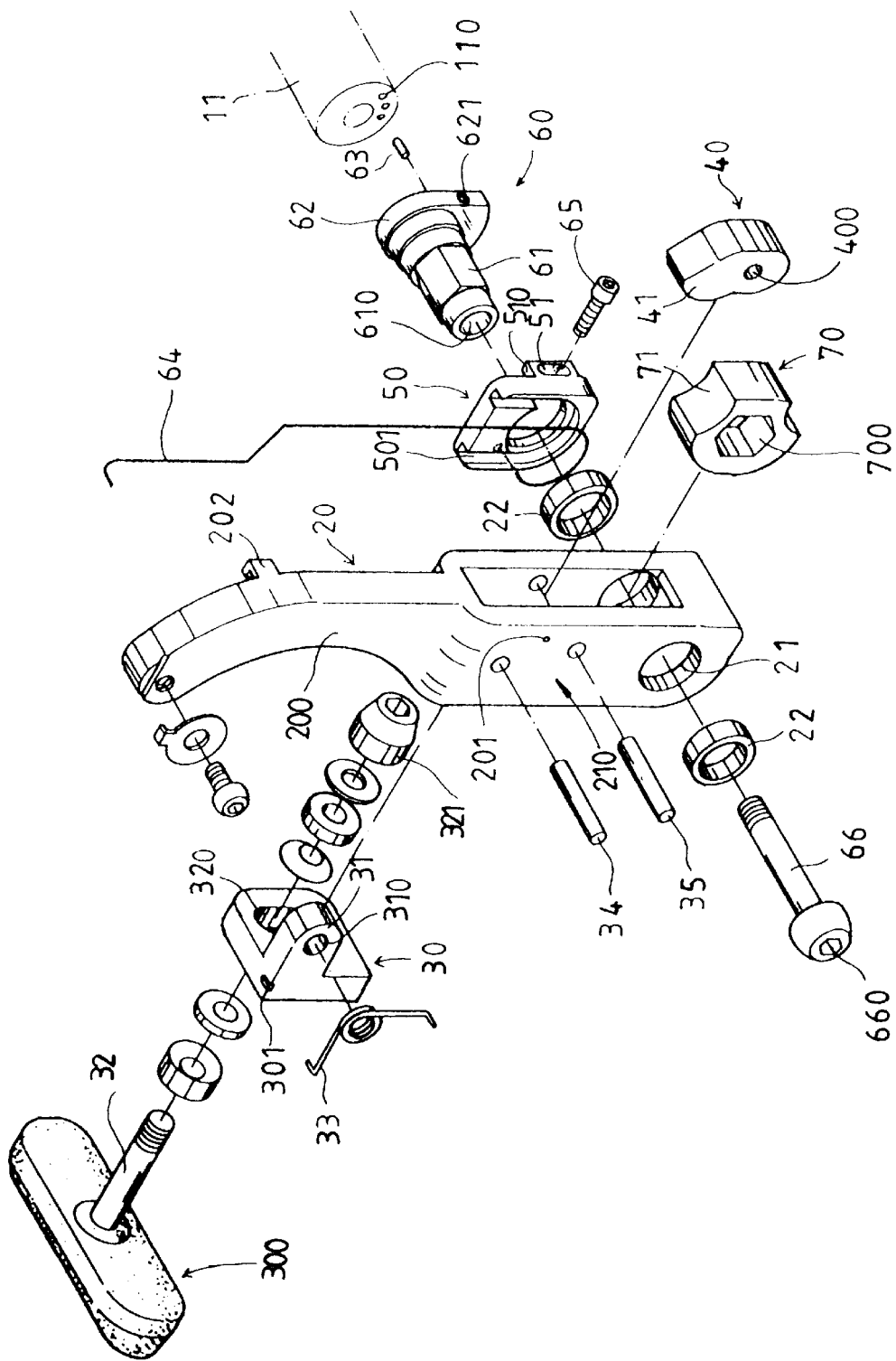
FIG. 2 is an exploded view of the brake caliper assembly and the caliper adjusting device in accordance with the present invention.
Figure 3:
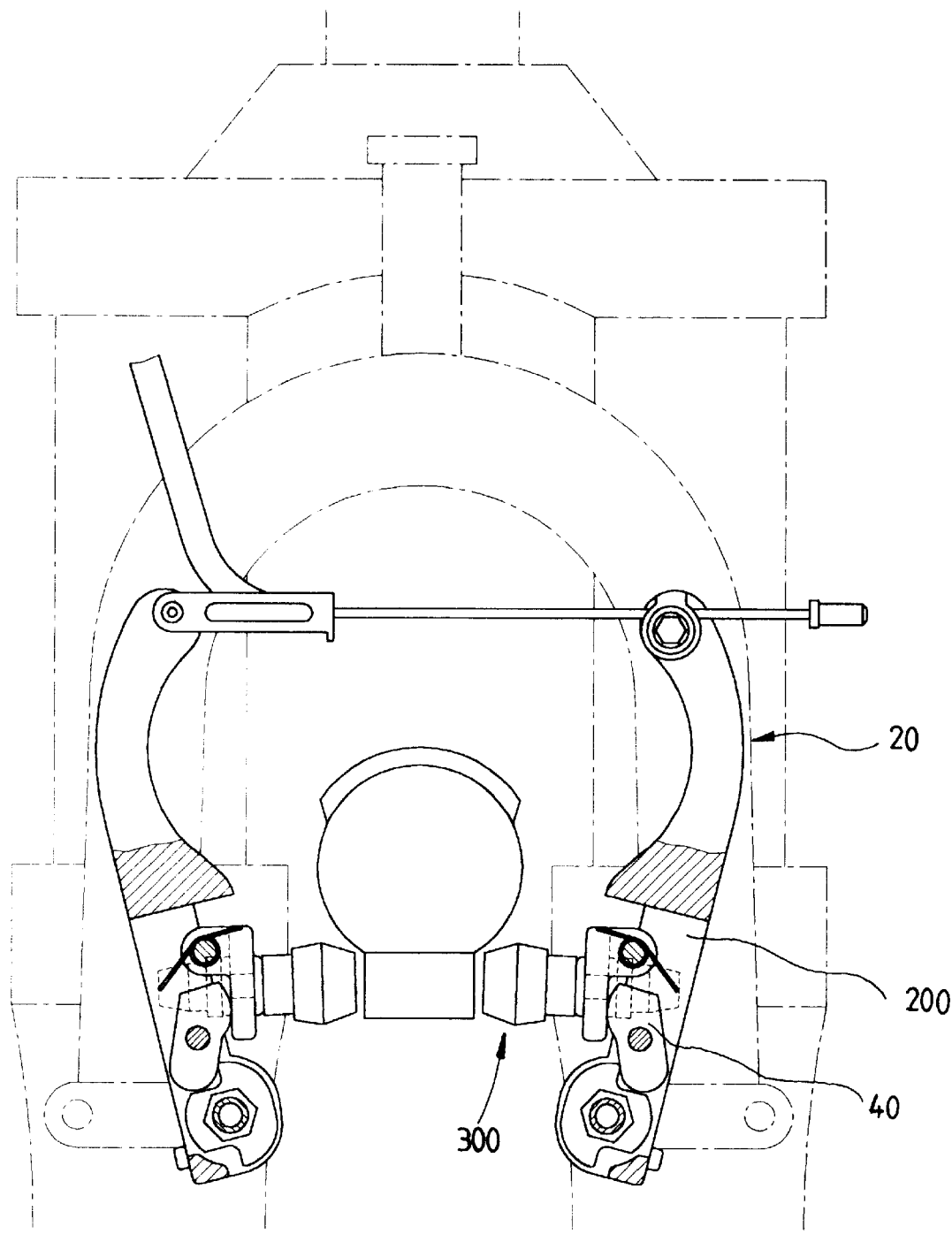
FIG. 3 is a front elevational view, partly in section, of the brake caliper system in accordance with the present invention connected to a bicycle.
Figure 4:
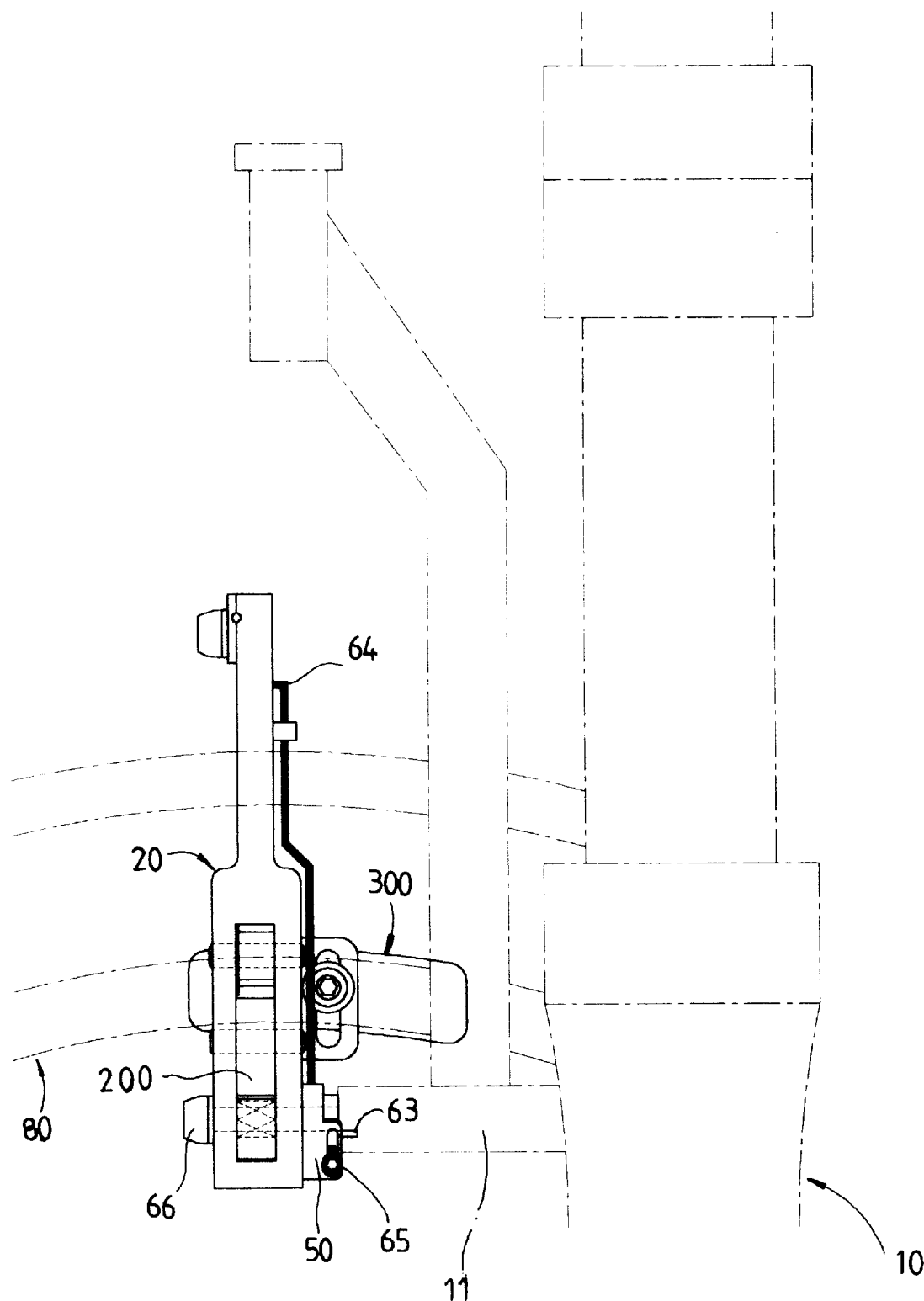
FIG. 4 is a side elevational view to show the adjusting member connected to the brake caliper and a bolt extends through the adjusting member.

Referring to FIGS. 1 to 5 and 7, the brake caliper assembly for a bicycle in accordance with the present invention comprises two brake calipers 20 each including a frame 210 and a head 200, the frame 210 having two sidewalls with a bottom and a top respectively connected between the two sidewalls. The head 200 extends from the top of the frame 210 and has a hook 202 extending therefrom. Each of the sidewalls has an aperture 21 defined therethrough so that two bushings 22 are respectively engaged with the two apertures 21. A shaft 60 is fixedly connected to a rod 11 extending from the front fork 10 and the shaft 60 extends through the two bushings 22 in the two apertures 21 of the two sidewalls. The shaft 60 has a threaded hole 621 defined radially in an end plate 62 at one of two ends of the shaft 60. The shaft 60 has a hexagonal section 61 so that a cam member 70 which has a hexagonal hole 700 is securely mounted to the shaft 60 with that the hexagonal section 61 securely engaged with the hexagonal section 700.

Figure 9:
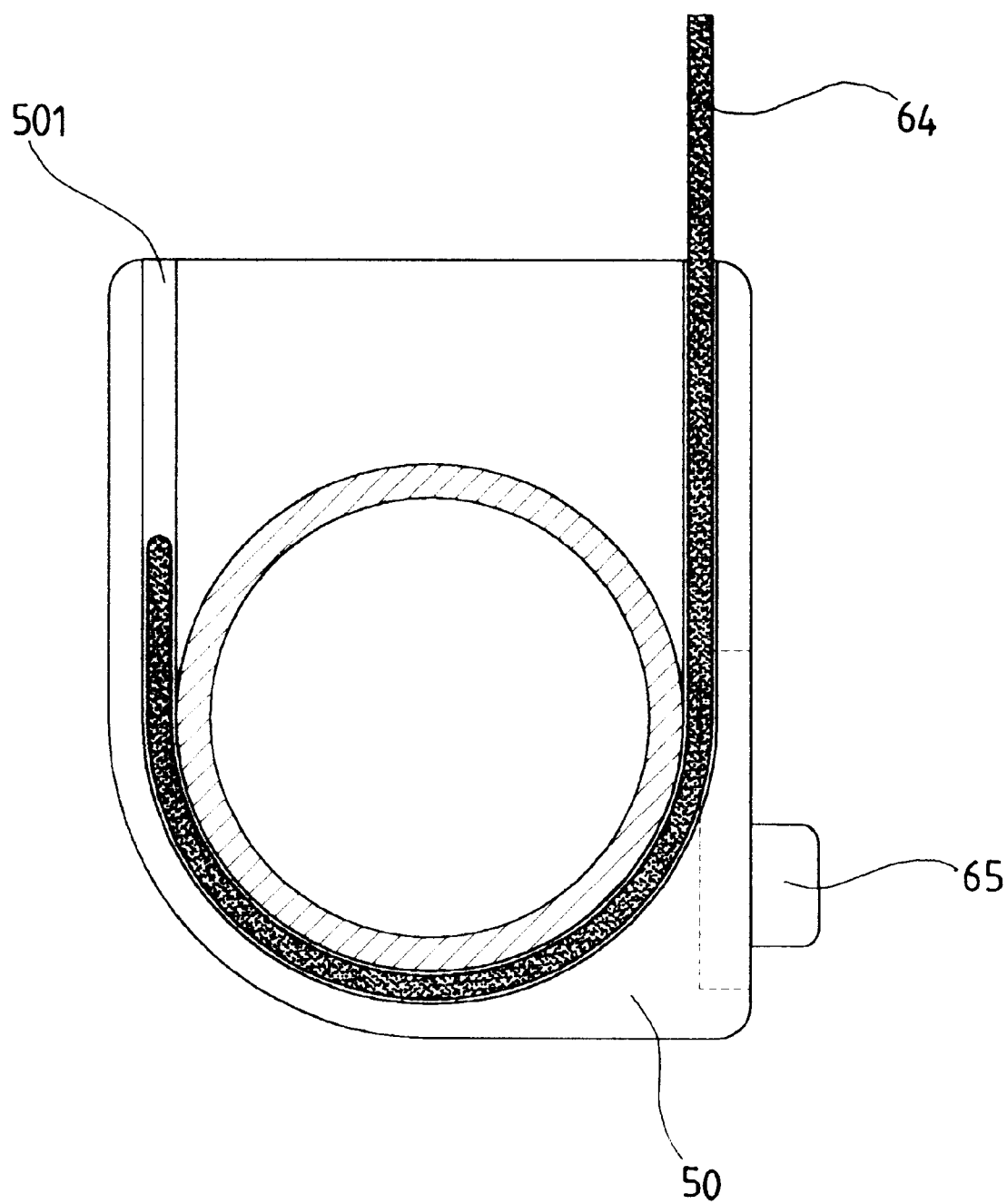
FIG. 9 is a illustrative view to show the bolt engaged with the adjusting member connected to the brake caliper.

An adjusting member 50 is connected to the outside of the frame 210 and rotatably mounted to the shaft 60. The adjusting member 50 has a groove 501 defined in one of two sides thereof and a lug 510 extends from the other side of the adjusting member 50. The lug 510 has a slot 51 defined therethrough. A biasing member 64 has the first end thereof connected to the hook 202 of the head 200 of the brake caliper 20 and the second end of the biasing member 64 is received in the groove 501 of the adjusting member 50. As shown in FIG. 9, a bolt 65 extends through the slot 51 and engaged with a threaded hole 621 in the shaft 60 and the head of the bolt 65 contacts against the surface of the lug 510. Therefore, the adjusting member 50 can be pivoted about the shaft 60 by rotating the bolt 65. A positioning bolt 66 extends through the frame 210 of the caliper 20 and fixedly received in a central passage 610 of the shaft 60. It is to be noted that three holes 110 are defined in the distal end of the rod 11 and a pin 63 extends from the end plate 62 so as to be received in one of the three holes 110 in the rod 11.

A supporting member 30 has a lug 31 extending from a side of the supporting member 30 and the lug 31 has a hole 310 defined therethrough so that the supporting member 30 is pivotally received between the two sidewalls of the frame 210 by a pin 34 extending through the sidewalls of the frame 210 and the hole 310. The supporting member 30 has a notch 301 defined in the outside thereof and one of the two sidewalls has a hole 201 defined therethrough so that a torsion spring 33 is connected between the notch 301 and the hole 201. The supporting member 30 further comprises a slot 320 defined through the supporting member 30. The brake pad 300 has a rod 32 extending therefrom which extends through the slot 320 and is secured to the supporting member 30 by a nut 321.

A pushing member 40 is pivotally received between the two sidewalls of the frame 210 by another pin 35 extending through the sidewalls of the frame 210 and a hole 400 in the pushing member 40. The pushing member 40 has the first end thereof engaged with the convex portion 71 of the cam member 70 and the second end 41 of the pushing member 40 contacts the supporting member 30.

Figure 6:
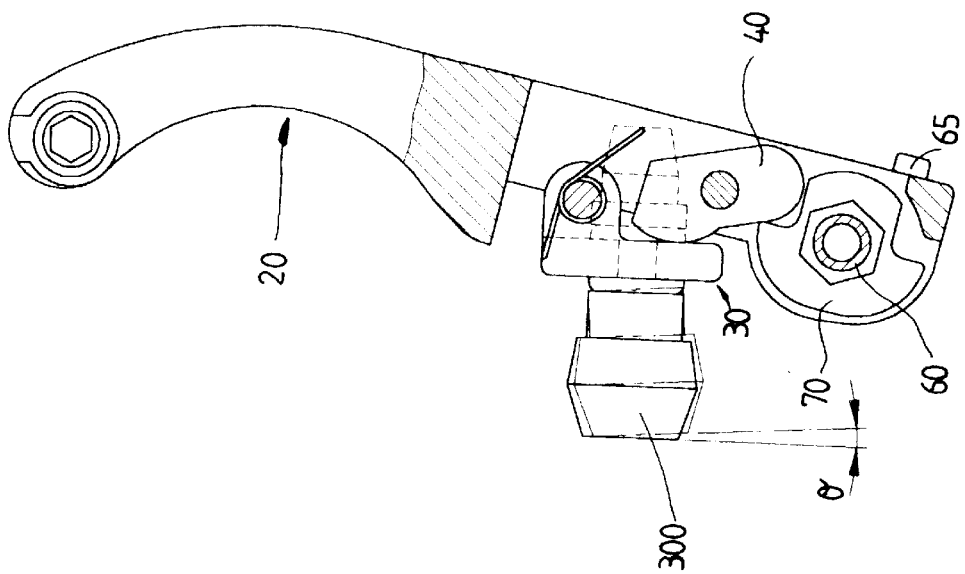
FIG. 6 is a side elevational view, partly in section, of the brake caliper in accordance with the present invention, wherein the bolt is moved toward the shaft and pushes the adjusting member to let the brake pad be adjusted.
Figure 5:
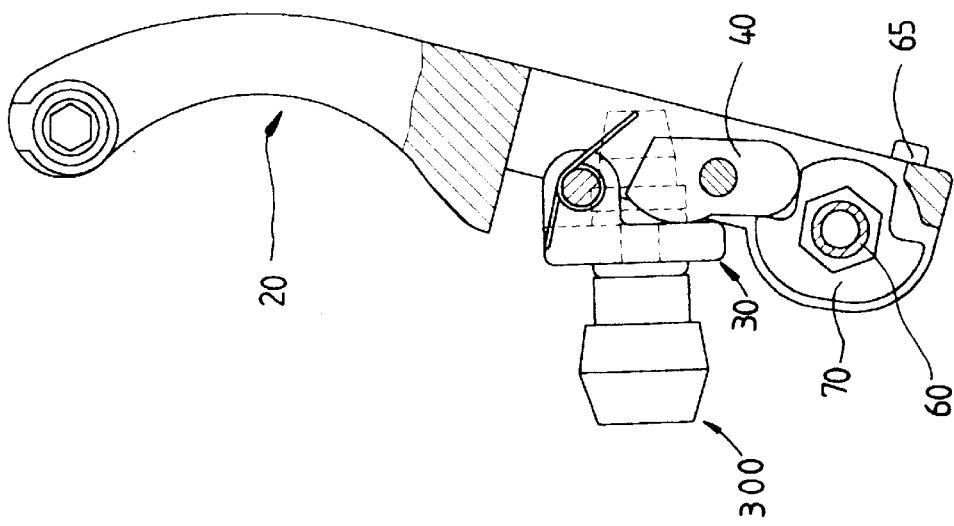
FIG. 5 is a side elevational view, partly in section, of the brake caliper in accordance with the present invention, wherein the bolt is not moved toward the shaft.
Figure 7:
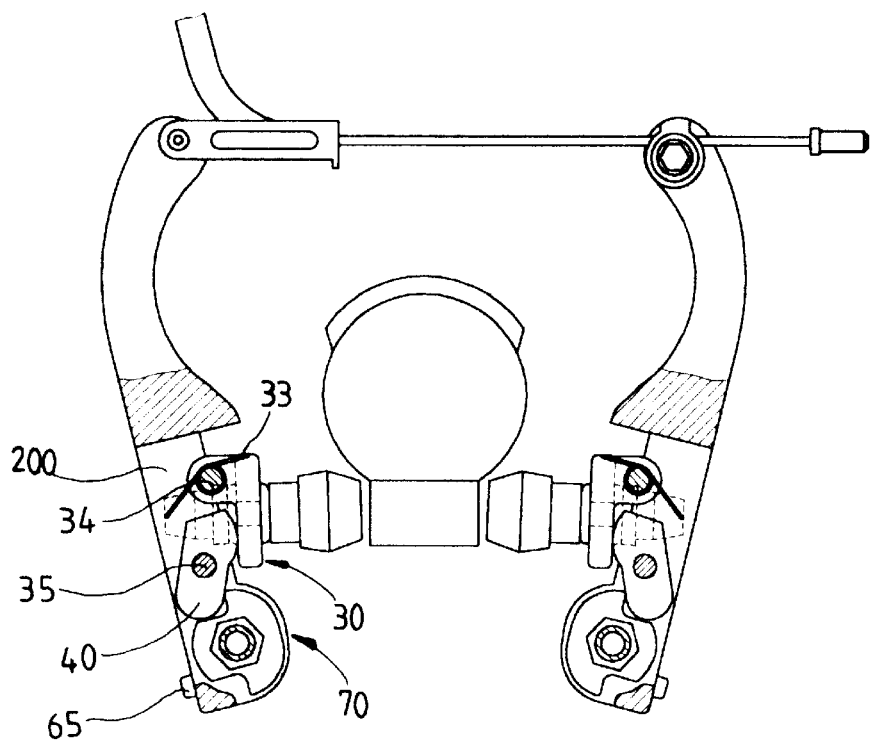
FIG. 7 is a front elevational view, partly in section, of the brake caliper system connected to the front fork of the bicycle and the wheel rim.
Figure 8:
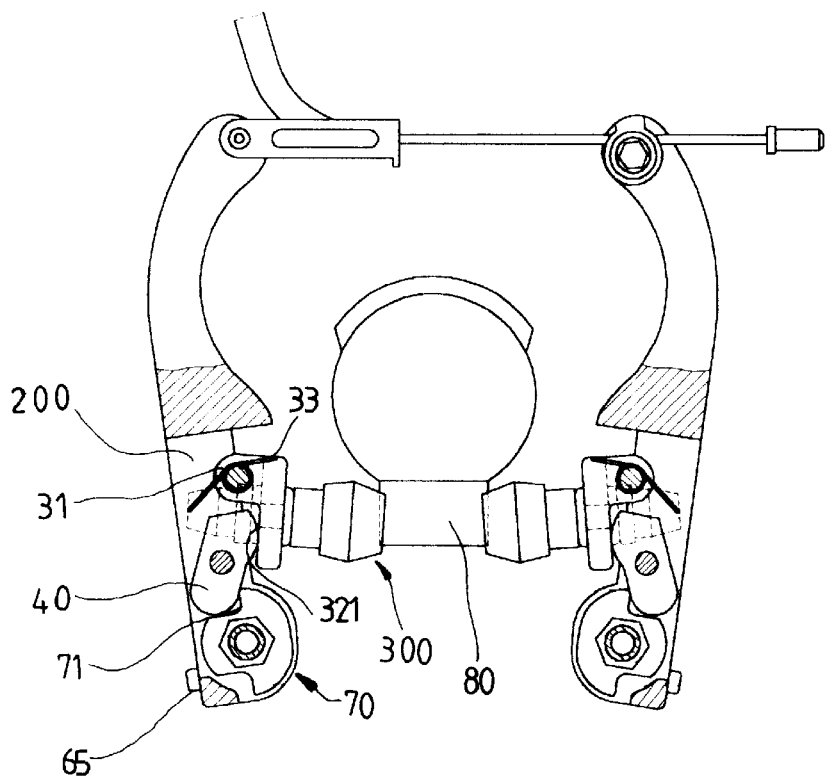
FIG. 8 is a front elevational view, partly in section, of the brake caliper system which is operated to clamp the wheel rim.

Referring to FIGS. 6 and 8, when moving the bolt 65 toward the shaft 60, the adjusting member 50 is rotated relative to the shaft 60 and let the head 200 of the brake caliper 20 be pivoted toward the wheel rim 80. The pivotal movement of the brake caliper 20 makes the pushing member 40 be pivoted by the fixed cam member 70 so that the second end 41 of the pushing member 40 pushes the supporting member 30 to let the angle θ between the brake pad 300 and the wheel rim 80 be changed.

It is to be understood that the above description and drawings are only used for illustrating some embodiments of the present invention, not intended to limit the scope thereof. Any variation and derivation from the above description and drawings should be included in the scope of the present invention.

What is claimed is:

1. A brake caliper adjusting device for a bicycle having a front fork, comprising:

a brake caliper including a frame and a head, said frame having two sidewalls with a bottom and a top respectively connected between said two sidewalls, said head extending from said top of said frame, each of said sidewalls having an aperture defined therethrough, a shaft adapted to be fixedly connected to the front fork and said shaft extending through said two apertures of said two sidewalls, said shaft having a threaded hole defined radially in one of two ends thereof;

a supporting member having a brake pad connected thereto, a lug extending from a side of said supporting member and pivotally received between said two sidewalls of said frame;

a cam member fixedly mounted to said shaft and located between said two sidewalls of said frame;

a pushing member pivotally received between said two sidewalls of said frame, said pushing member having the first end thereof contacting said cam member and the second end of said pushing member contacting said supporting member, and an adjusting member connected to the outside of said frame and rotatably mounted to said shaft, said adjusting member having a groove defined in one of two sides thereof, a lug extending from the other side of said adjusting member and having a slot defined therethrough, a biasing member having the first end thereof connected to said head of said brake caliper and the second end of said biasing member received in said groove of said adjusting member, a bolt extending through said slot and engaged with a threaded hole in said shaft.

2. The device as claimed in claim 1, wherein said shaft has a hexagonal section and said cam member has a hexagonal hole defined therethrough so that said hexagonal section is securely engaged with said hexagonal section.

3. The device as claimed in claim 1, wherein said cam member has a convex portion in the top thereof and said first end of said pushing member contacts said convex portion.

4. The device as claimed in claim 1 further comprising two bushings engaged with said two apertures of said two sidewalls of said frame, said shaft engaged with said two bushings so that said brake caliper is rotated relative to said shaft.

5. The device as claimed in claim 1, wherein said supporting member has a notch defined in the outside thereof and one of said two sidewalls has a hole defined therethrough so that a torsion spring is connected between said notch and said hole.

6. The device as claimed in claim 1 further comprising a slot defined through said supporting member, said brake pad having a rod extending therefrom which extends through said slot and is secured to said supporting member by a nut.

* * * * *